United States Patent [19]

Loewenberg et al.

[11] 4,048,375

[45] Sept. 13, 1977

[54] MAGNETIC RECORDING MEDIA OF IMPROVED MECHANICAL RESISTANCE

[75] Inventors: Gustav Loewenberg, Ludwigshafen; Hans-Joerg Hartmann, Freinsheim; Dieter Schaefer, Lindenberg; Herbert Motz; Helmut Jakusch, both of Ludwigshafen, all of Germany

[73] Assignee: BASF Aktiengesellschaft, Ludwigshafen, Germany

[21] Appl. No.: 708,603

[22] Filed: July 26, 1976

[30] Foreign Application Priority Data

Aug. 8, 1975 Germany .............................. 2535448

[51] Int. Cl.$^2$ ............................................. H01F 10/02
[52] U.S. Cl. .................................. 428/474; 252/62.54; 428/538; 428/539; 428/900
[58] Field of Search .................................. 427/127–132, 427/48; 252/62.54; 428/423, 457, 458, 474

[56] References Cited

U.S. PATENT DOCUMENTS 3,387,993  6/1968  Flowers ........................... 427/128 X

*Primary Examiner*—Bernard D. Pianalto
*Attorney, Agent, or Firm*—Keil, Thompson & Shurtleff

[57] ABSTRACT

Magnetic recording media consisting of a non-magnetic base and, applied thereto, a firmly adhering magnetic coating based on finely divided magnetic pigment dispersed in organic binders, which coating contains, according to the invention, salts of long-chain basic polyaminoamides with high molecular weight organic acid esters.

Such magnetic recording media exhibit improved mechanical resistance and improved adhesion of the coating to the base, coupled with advantageous electromagnetic properties.

4 Claims, No Drawings

MAGNETIC RECORDING MEDIA OF IMPROVED MECHANICAL RESISTANCE

The present invention relates to magnetic recording media consisting of a non-magnetic base and, applied thereto, a firmly adhering magnetic coating based on finely divided magnetic pigment dispersed in organic binders, which magnetic coating contains salts of long-chain polyaminoamides and high molecular weight acid esters in addition to other dispersing agents and additives for improving the mechanical resistance of the coating.

Magnetic recording media are used to record audio and video signals and digital data, and depending on the type of recording the mechanical properties, in particular, of the magnetic coating have to meet different requirements.

In the case of video and computer tapes the speed between the tape and the magnetic head is very high. To withstand this stress, the adhesion of the coating to the base, and the resistance of the coating to abrasion by parts of the apparatus in the tape path are of particular importance. Computer tapes are subjected to severe stresses particularly in the case of frequent reversals, the stresses being caused not only by the capstan and pinch roll but also by the sliding contact between the tape and head. Depending on the type of drive unit and the degree of wear of the magnetic head, it can happen, with frequently used tapes, that damage to the magnetic coating results in an increasing number of write and read errors and even in the irreversible loss of data.

Magnetic discs, used in modern data processing units, are operated at speeds of up to 3,600 rpm. The magnetic heads, due to their aerodynamic shape, fly at a small distance above the surface of the disc on a cushion of air which is produced by rotation of the disc. The distance between the disc surface and the magnetic head can be as little as $0.5\mu u$. With such small distances, microscopic foreign particles, such as dust, or the slightest unevenness in the coating, can suffice to disturb the flight of the magnetic head to a degree which causes contact between the head and the disc. This can result in the loss of data or in damage to the magnetic disc. The deposits of coating material on the head and on the surface of the disc can easily lead to head crashes because they interfere with the flight of the magnetic head, and such crashes can result in the destruction of the magnetic head and render the disc pack unusable. Hence, the data-bearing layer of magnetic discs, which in general is from 1.0 to $2.0\mu u$ thick because of the high resolution required, also has to meet high standards as regards mechanical resistance.

The reliability of audio tapes, e.g. tapes for amateur use and cassette tapes, depends greatly on the abrasion resistance of the magnetic coating even under extremely unfavorable climatic conditions, e.g. high temperature and high atmospheric humidity, and also under unfavorable apparatus conditions, e.g. as found with apparatus where the parts which come into contact with the tape are badly worn and can therefore have a very abrasive effect on the tape surface. The occurrence of one or more of these factors, in conjunction with inadequate abrasion resistance of the coating, can result in deposits of coating material on the magnetic head and on the parts of the apparatus in the tape path, such as the capstan and guide pins, and this in turn can result in a poor recording and playback signal level, and/or in wow and flutter. Tapes with inadequate abrasion resistance, used under unfavorable conditions, necessitate constant cleaning of the soiled parts of the apparatus.

The addition of solid or liquid lubricants, such as graphite, molybdenum disulfide, stearic acid, oleic acid, fatty acid esters, fatty acid amides, squalenes and paraffin waxes, to the magnetic coating, in order to provide abrasion-resistant magnetic recording media, has been disclosed. As stated in German published application No. 1,278,513, many of the known lubricants, e.g. fatty acid esters, tend to exude easily and cause undesirable tackiness of the coating. The addition of fatty acid esters such as stearyl stearate also gives unsatisfactory electoacoustic and video recording properties. Furthermore, these additives, as well as the addition of fatty acids such as n-stearic acid or mixtures of fatty acid amides and paraffin wax, tend to produce deposits on the parts with which the tape comes into contact. In addition, most lubricants have a plasticizing action on the binder contained in the magnetic coating.

It is an object of the present invention to provide magnetic recording media which exhibit better mechanical resistance and anchorage of the coating than prior art products, while having advantageous electromagnetic properties.

We have found that this object is achieved and that magnetic recording media comprising a non-magnetizable base and, applied thereto, a firmly adhering coating suitable for magnetic recording and consisting essentially of a finely divided magnetic powder dispersed in an organic polymeric binder, exhibit particularly advantageous properties and improved mechanical resistance if the said coating contains from 0.2 to 5 per cent by weight, based on the total weight of the coating, of a salt of a. a basic polyaminoamide, obtained by condensing dimerized and trimerized unsaturated fatty acids with aliphatic polyamines possessing two primary amino groups and b. an organic acid ester, obtained by reacting equimolar amounts of a polyalkylene glycol of molecular weight from 100 to 500, a monocarboxylic acid of 10 to 22 carbon atoms and a dicarboxylic acid anhydride or a dicarboxylic acid of 2 to 8 carbon atoms.

The organic salts contained in the magnetic coating of the magnetic recording medium of the invention are obtained by reacting a basic polyaminoamide with a polymeric ester which contains carboxyl groups. The basic component of the salt, i.e. the polyaminoamide, is preferably manufactured by conventional methods, by reacting fatty acid oligomers with polyamines such as diethylenetriamine, triethylenetetramine, tetramethylenepentamine, 1,4-diaminobutane, 1,3-diaminobutane, hexanemethylenediamine, diacetoneamine, 3-(N-isopropylamino)-propylamine, 3,3'-amino-bis-propylamine and similar amines (cf. Houben-Weyl, Methoden der organischen Chemie, 4th Edition, Volume XIV/2, Stuttgart 1963, pages 523-525). Of the fatty acid oligomers which are employed for the manufacture of the polyaminoamides, those produced by dimerizing or trimerizing unsaturated fatty acids or drying oils, their free acids, such as linoleic acid, or the esters of these acids with monohydric alcohols, are particularly suitable. Suitable commercially available products are the ®VERSAMID resins from General Mills, Inc. A method of maufacture of the acid component of the salt is to react a polyalkylene glycol having a molecular weight of from 100 to 500 with an equimolar amount of a saturated or unsaturated, straight-chain or branched fatty acid of 10 to 22 carbon atoms so as to esterify one of the two OH groups, and to react the resulting product with a dicarboxylic acid anhydride or a dicarboxylic acid of 2 to 8 carbon atoms. It is particularly advantageous to react a polyethylene glycol or a polypropylene glycol (e.g. of molecular weight 150 to 500), and especially the corresponding trimeric alkylene glycols, with a monocarboxylic acid of 10 to 18 carbon atoms, e.g. oleic acid or ricinoleic acid, and a dicarboxylic acid of 2 to 8 (e.g. 4 to 6) carbon atoms, e.g. maleic acid or adipic acid, to give the diester which possesses a free acid group.

The resulting carboxylic acid and the polyaminoamide are then reacted with one another, advantageously in such weight ratios that a neutral salt is produced. The reaction can, if appropriate, be carried out in a suitable polar or non-polar solvent.

When producing the magnetic coating, the above salts are added in an amount of from 0.2 to 5 percent by weight, preferably from 0.5 to 3 percent by weight, based on the dry weight of the magnetic coating. A ratio of from 3 to 5 parts by weight of magnetic pigment, especially gamma-iron (III) oxide of chromium dioxide, to about 1 part by weight of binder, from 0.05 to 0.5 part by weight of other additives, e.g. dispersing agents and, e.g., additives for improving the electrical conductivity of the magnetic coating, and from 0.05 to 0.2 part by weight of the organic salts added according to the invention, has proved very advantageous.

Preferred magnetic pigments are finely divided acicular gamma-iron(III) oxide having a length of from 0.1 to 2μu and especially from 0.1 to 0.9μu or acicular chromium dioxide of the same length. Further suitable magnetic pigments are cubic gamma-iron(III) (III) oxide modified with heavy metals, especially cobalt, and finely divided metal alloys of iron, cobalt and/or nickel.

Further additives for the production of magnetic coatings, such as dispersing agents, e.g. lecithins, small amounts of a monocarboxylic acid or of mixtures of monocarboxylic acids, in the case of chromium dioxide preferably zinc oleate, zinc stearate or zinc isostearate, and fillers, e.g. conductive carbon, graphite, quartz powder and/or non-magnetizable silicate-based powders, and flow improvers, e.g. small amounts of silicon oil, can be added to the magnetic dispersions. The total amount of these additives should advantageously not exceed 12 percent by weight, and preferably not exceed 8 percent by weight, based on the dry weight of the magnetic coating.

Suitable binders for the preparation of the magnetic dispersion are those conventionally used for the production of magnetic coatings, e.g. alcoholic solvent-soluble copolyamides, polyvinylformals, polyurethane elastomers, mixtures of polyisocyanates and polyhydroxylic compounds, vinyl chloride polymers containing more than 60% by weight of polymerized vinyl chloride units, e.g. vinyl chloride copolymers with comonomers such as vinyl esters of monocarboxylic acids of 2 to 9 carbon atoms, esters of aliphatic alcohols of 1 to 9 carbon atoms and ethylenically unsaturated carboxylic acids of 3 to 5 carbon atoms, e.g. the esters of acrylic acid, methacrylic acid or maleic acid, or these carboxylic acids themselves, and vinyl chloride copolymers which contain hydroxyl groups and can be manufactured by partial hydrolysis of vinyl chloride/vinyl ester copolymers or by direct copolymerizaton of vinyl chloride with monomers containing hydroxyl groups, e.g. allyl alcohol, 4-hydroxybutyl methacrylate or acrylate, or 2-hydroxylethyl methacrylate or acrylate, or 2-hydroxyethyl methacrylate or acrylate. Further suitable binders are mixtures of polyurethane elastomers with polyvinylformals, phenoxy resins and vinyl chloride copolymers of the stated composition. Preferred binders are polyvinylformal binders and polyurethane elastomer mixtures of the stated type, above all mixtures with polyvinylformals. Preferred polyurethane elastomer binders are commercially available elastomeric polyester-urethanes obtained from adipic acid, 1,4-butanediol and 4,4'-diisocyanatodiphenylmethane.

When using flexible bases, particularly suitable binder mixtures for the production of the magnetic recording media of the invention are mixtures consisting of from 20 to 90 percent by weight of an elastomeric polyurethane which is virtually free from isocyanate groups, is soluble in a volatile organic solvent and has been obtained from a linear aliphatic polyester or polyether and a diisocyanate of 6 to 24 carbon atoms; and from 10 to 80 percent by weight of a vinyl chloride copolymer which contains from 50 to 90 percent by weight of vinyl chloride units, and from 10 to 50 percent by weight of units of at least one diester of maleic acid with an alcohol of 1 to 3 carbon atoms, or from 10 to 80 percent by weight of a phenoxy resin produced from bisphenol A and epichlorohydrin.

Magnetic dispersions which are particularly suitable for the production of rigid magnetic discs preferably contain binders such as epoxy resins, phenoxy resins, aminoplast precondensates, polyester resins, polyurethanes or polyurethane-forming reactants and mixtures of such binders with one another or with other binders, such as polycarbonates or vinyl polymers, e.g. vinyl chloride copolymers or vinylidene chloride copolymers or heat-curable acrylate or methacrylate copolymers.

The preferred binder for the manufacture of the magnetic discs is a mixture of from 60 to 70% by weight of a solid curable polycondensate of 2,2-bis-(4-hydroxyphenyl)-propane and epichlorohydrin having an epoxy equivalent weight of from about 400 to 2,500 and a melting point of from about 50° to 150° C, from 10 to 30% by weight of a curable allyloxybenzene-formaldehyde condensate of the resol type with free methylol groups or with methylol groups etherified with a lower alcohol, the condensate having a molecular weight of less than 1,000 and from 10 to 30% by weight of a curable melamineformaldehyde condensate with more than two methylol groups etherified with n-butanol or iso-butanol, the condensate having a molecular weight of less than 2,500.

Suitable organic solvents for the preparation of the magnetic dispersion are those conventionally used for this purpose, especially aromatic hydrocarbons, e.g. benzene, toluene or xylene, alcohols, e.g. propanol or butanol, ketones, e.g. acetone or methyl ethyl ketone, ethers, e.g. tetrahydrofuran or dioxane, and mixtures of such solvents, and other solvents and solvent mixtures conventionally used for surface-coating binders.

It has proved advantageous to employ the above-mentioned organic salts of the polyaminoamides from the start of the dispersion operation, in the conventional apparatus used for this purpose, together with the magnetic pigment, the additives, a part of the binder and an amount of organic solvent sufficient to bring the viscosity of the mixture to an advantageous value. However, it is also possible to admix the organic salts, added according to the invention, during subsequent processing, up to the point directly before the finished dispersion is applied to the base.

The magnetic recording media of the invention can be manufactured by conventional methods. Advantageously, the dispersion produced in dispersing equipment, e.g. a tube mill or a stirred ball mill, from the magnetic pigment and a solution of the binder or binders, in the presence of dispersing agents and other additives, is filtered and is applied to the non-magnetic base by means of conventional coating equipment, e.g. by means of a knife coater. As a rule, orientation of the magnetic particles is carried out before the fluid coating mixture is dried on the base; drying is advantageously carried out for from 2 to 5 minutes at from 50° to 90° C.

Suitable non-magnetic bases for the magnetic coating are those conventionally used for this purpose, e.g. films of the usual thickness based on polyvinyl chloride or polyesters such as polyethylene terephthalate films. The application of an adhesion-promoting intermediate coating, e.g. one based on a vinylidene chloride copolymer, to the base, before applying the magnetic coating, is feasible and sometimes advantageous.

The magnetic coating can be calendered on conventional equipment by passing them between polished rollers optionally heated to temperatures of from 50° to 100° C, preferably from 60° to 80° C. The thickness of the magnetic coating is in general from 3 to 20µu and preferably from 8 to 15µu. For the production of magnetic tapes, the coated webs of base material are slit lengthwise to the conventional widths.

When producing magnetic coatings for magnetic discs, it has proved advantageous to apply the dispersion, containing the magnetic pigment, radially to the slowly rotating substrate and then to distribute the dispersion over the substrate by rotating it at high speed. For this purpose, conventional non-magnetic metallic substrates of the usual sizes and thicknesses, made from aluminum or aluminum alloys, can be used. For the manufacture discs with thin magnetic coatings it is advantageous to use substrates having polished surfaces.

Compared to conventional magnetic recording media of the same type, the magnetic recording media of the invention are distinguished by improved mechanical resistance and improved anchorage of the coating, coupled with very advantageous electromagnetic properties.

The following Examples and Comparative Experiments illustrate the advantages of the magnetic recording layer of the invention when used on computer tape, audio cassette tape and magnetic discs. Parts and percentages in the Examples are by weight, unless stated otherwise.

EXAMPLE 1

A. Preparation of the polyaminoamide salt I 1 mole of triethylene glycol, 1 mole or ricinoleic acid and 1 mole of adipic acid are esterified. 1 part of the resulting diester is dissolved in 2 parts of tetrahydrofuran and a solution of 0.5 part of a polyaminoamide having an amine number of about 210–230 and a viscosity of 40° C of 500–750 poise, and containing 6.48 milliequivalents of amine hydrogen/g, e.g. ®VERSAMID 115 of General Mills Co., in 1 part of tetrahydrofuran, is added in the course of about 30 minutes. The mixture is heated at 50° C for about 2 hours and the solvent is then distilled off.

B. Preparation of the polyaminoamide salt II 1 mole of polypropylene glycol having a molecular weight of about 500, 1 mole of oleic acid and 1 mole of maleic anhydride are esterified. 1 part of the resulting diester is dissolved in 2 parts of tetrahydrofuran and a solution of 0.16 part of a polyaminoamide having an amine number of 325–360 and a viscosity of 40° C of 44 poise, and containing 9.99 milli-equivalents of amine hydrogen/g, e.g. ®VERSAMID 140 of General Mills Co., dissolved in 0.32 part of tetrahydrofuran, is added in the course of about 30 minutes. The mixture is heated at 50° C for about 2 hours and the solvent is then distilled off.

EXAMPLE 2

Computer tape

EXAMPLES 2A, 2B AND COMPARATIVE EXPERIMENT (EXAMPLE 2C)

The magnetic coatings shown below (Table 1) were produced by prior art processes. The base used was a 36µu thick polyethylene terephthalate film.

TABLE 1

| Composition | Example 2A (%) | Example 2B (%) | Comparative Example 2C (%) |
|---|---|---|---|
| gamma-iron(III) oxide | 71.4 | 72.2 | 73.0 |
| conductive carbon | 4.2 | 4.3 | 4.4 |
| phenoxy resin 30 (1) | 4.2 | 4.2 | 4.2 |
| polyurethane +(2) | 16.3 | 16.5 | 16.7 |
| di-n-octyl sebacate | 0.8 | — | 0.7 |
| soybean lecithin | 1.0 | 1.0 | 1.0 |
| dimethylpolysiloxane +(3) | — | 0.7 | — |
| polyaminoamide salt I | 2.1 | — | — |
| polyaminoamide salt II | — | 1.1 | — |

+(1) phenoxy resin manufactured from bisphenol A and epichlorohydrin, molecular weight 30,000.
+(2) elastomeric isocyanate-free linear polyurethane manufactured from adipic acid, 1,4-butanediol and 4,4-diisocyanatodiphenylmethane,
+(3) viscosity: 150 cp.

Computer tape test 15 cm lengths of tape from Example 2A, Example 2B and Comparative Example 2C were each subjected to 50,000 passes on an IBM 2401 computer tape drive. The increase in drop-outs, the waveform of the playback signal, the condition of the tape surface and the amount of material abraded from the tape and deposited on the magnetic head was assessed. The degree of abrasion is assessed visually by stripping the deposit from the pole faces of the head by means of adhesive tape and sticking the latter onto white paper, and is classified according to a 6-rating scale, 1 denoting no abrasion and 6 very marked abrasion. To determine the anchorage, no incision is made across the coating with a knife. An adhesive tape is stuck over the damaged area and then pulled off with a sharp tug. The extent to which the coating continues to tear from the incision is assessed.

| Results | Example 2A | Example 2B | Comparative Example 2C |
|---|---|---|---|
| increase in errors | 0 | 0 | 0 |
| tape surface | unchanged | unchanged | polished shallow grooves in the longitudinal direction |
| waveform of the signal on outer | drops in original signal level of | drops in original signal level of | drops in original signal level of 40% |

| Results | Example 2A | Example 2B | Comparative Example 2C |
|---|---|---|---|
| tracks deposits of coating material on the magnetic head - rating | 10% | 15% | |
| anchorage | 1 no tearing | 1 no tearing | 3 coating tears for about 1 cm from the incision |

EXAMPLE 3

Audio cassette tape

EXAMPLES 3A and 3B AND COMPARATIVE EXPERIMENT (EXAMPLE 3C)

The magnetic coatings shown below (Table 2) were produced by prior art processes. The base used was a 12μu thick polyethylene terephthalate film.

TABLE 2

| Composition | Example 3A (%) | Example 3B (%) | Comparative Example 3C (%) |
|---|---|---|---|
| gamma-iron(III) oxide | 78.8 | 79.2 | 79.7 |
| vinyl chloride copolymer +(1) | 5.4 | 8.9 | 8.9 |
| polyurethane +(2) | 12.3 | 8.9 | 8.9 |
| silicone oil +(3) | 0.5 | 0.6 | 0.5 |
| lecithin | — | 0.8 | 2.0 |
| polyaminoamide salt I | 3.0 | — | — |
| polyaminoamide salt II | — | 1.6 | — |

+(1) Vinyl chloride/dialkyl maleate copolymer containing 80% of vinyl chloride units, 10% of dimethyl maleate units and 10% of diethyl maleate units.
+(2) Elastomeric isocyanate-free linear polyurethane manufactured from adipic acid, 1,4-butanediol and 4,4-diisocyanatodiphenylmethane.
+(3) dimethylpolysiloxane having a viscosity of 150 cp.

Audio cassette tape test

A signal having a frequency of 10 kc/s is recorded on a cassette tape over a length of about 200 cm. The length of tape is then rewound in contact with the magnetic head and the recorded signal is reproduced, the playback voltage being recorded on a graphic recorder. After this, the length of tape is rewound again, the old recording is erased and a 10 kc/s signal is again recorded and reproduced. This procedure is repeated a total of 50 times. Since a new recording is made each time, this test is also very suitable for detecting slight deposits on the head and coating wear. The experiment is carried out at room temperature and 40° C. The drop in signal level and the amount of abraded material deposited on the pole faces of the recording and reproducing head can be taken as a measure of the wear resistance of the tape. The degree of abrasion is assessed as described in Example 2.

| Results | Example 3A | Example 3B | Comparative Example 3C |
|---|---|---|---|
| a) room temperature: | | | |
| drop in signal level (db) | 0 | 0.5 | 4 |
| deposits on head, rating | 1 | 1 | 2-3 |
| b) 40° C: | | | |
| drop in signal level (db) | 0 | 1.5 | 6 |
| deposits on head, rating | 1 | 1-2 | 2-4 |

EXAMPLE 4

Magnetic discs

EXAMPLES 4A AND COMPARATIVE EXPERIMENT (EXAMPLE 4C)

The magnetic coatings for magnetic memory discs shown below (Table 3) were produced by prior art processes. The substrates used were aluminum discs, onto which the coating was baked at about 260° C.

TABLE 3

| Composition of magnetic coating | Example 4A | Example 4B | Comparative Example 4C |
|---|---|---|---|
| iron(III) oxide | 48.0 | 48.0 | 48.5 |
| fused alumina | 2.4 | 2.4 | 2.4 |
| dimethylpolysiloxane +(1) | 0.5 | 0.5 | 0.6 |
| epoxy resin +(2) | 28.9 | 28.9 | 29.1 |
| melamine-formaldehyde resin +(3) | 9.6 | 9.6 | 9.7 |
| phenol-formaldehyde resin +(4) | 9.6 | 9.6 | 9.7 |
| polyamindamide salt I | 1.0 | — | — |
| polyaminoamide salt II | — | 1.0 | — |

+(1) Viscosity of a 70% strength solution in xylene: 700 – 1,000 cp.
+(2) Epoxy resin manufactured from bisphenol A and epichlorohydrin, epoxy equivalent weight about 1,850.
+(3) Melamine-formaldehyde resin etherified with butanol, molecular weight about 2,000.
+(4) Allyloxybenzene/formaldehyde condensate of the resol type, molecular weight about 310.

Disc test

To test the adhesion of the magnetic coating to the aluminum surface, roughened, square pieces of aluminum havng a surface area of 1 cm² are glued onto the surface of the magnetic coating by means of an epoxy/polyamine 2-component adhesive, which is then cured for 1 hour at 80° C. The force required to tear off the aluminum cube is then measured. To test the resistance to mechanical wear, the magnetic disc is rotated at a speed of 2,400 rpm on a test drive unit. A ceramic body having the shape of a magnetic write-and-read head is then caused to fall synchronously onto the magnetic disc from a distance of 5 mm, with a force of 300 g. In this test, the head lands in a zone which covers only 1/20 of the total track length (about 1 m). The wear resistance of the magnetic coating is assessed in terms of the number of crashes required to wear down the magnetic coating to the aluminum substrate.

| Test results | Example 4A | Example 4B | Comparative Example 4C |
|---|---|---|---|
| adhesion (N/cm²) | 950 | 1,100 | 600 |
| wear test (number of crashes) | >1,500 | 1,300 | 1,000 |

We claim:

1. In a magnetic recording medium comprising a non-magnetizable base and, applied thereto, a firm adhering coating suitable for magnetic recording and consisting essentially of a finely divided magnetic powder dispersed in an organic polymeric binder, the improvement which comprises: including in said coating from 0.2 to 5% by weight, based on the total weight of the coating, of a neutral salt of (a) a basic polyaminoamide, obtained by condensing dimerized and trimerized unsaturated fatty acids with aliphatic polyamines possessing two primary amino groups and having an amine value of from 100 to 500 and (b) an organic acid ester, obtained by reacting equimolar amounts of a polyalkylene glycol of molecular weight from 100 to 500, a monocarboxylic acid of 10 to 22 carbon atoms and a dicarboxylic acid anhydride or a dicarboxylic acid of 2 to 8 carbon atoms.

2. A magnetic recording medium as set forth in claim 1 wherein the amount of said neutral salt is from 0.5 to 3% by weight based on the total weight of the coating.

3. A magnetic recording medium as set forth in claim 1, wherein the organic acid ester (b) is obtained by reacting equimolar amounts of a polyalkylene glycol selected from the group consisting of polyethylene glycol and polypropylene glycol having a molecular weight of from 150 to 500, a fatty acid of 10 to 18 carbon atoms and a dicarboxylic acid of 2 to 8 carbon atoms.

4. A magnetic recording medium as set forth in claim 1 wherein said aliphatic polyamine is selected from the group consisting of diethylenetriamine, triethylenetetramine, tetramethylenepentamine, 1,4-diaminobutane, 1,3-diaminobutane, hexanemethylenediamine, diacetoneamine, 3-(N-isopropylamino)-propylamine and 3,3'-imino-bis-propylamine.

* * * * *